(12) United States Patent
Vaniglia et al.

(10) Patent No.: US 10,059,067 B2
(45) Date of Patent: Aug. 28, 2018

(54) SMALL 4-AXIS FIBER PLACEMENT MACHINE

(71) Applicant: FIVES MACHINING SYSTEMS, INC., Fond du Lac, WI (US)

(72) Inventors: Milo Vaniglia, Cold Spring, KY (US); Richard A. Curless, Cincinnati, OH (US); Daniel Allman, Hebron, KY (US)

(73) Assignee: FIVES MACHINING SYSTEMS, INC., Fond Du Lac, WI (US)

( * ) Notice: Subject to any disclaimer, the term of this patent is extended or adjusted under 35 U.S.C. 154(b) by 373 days.

(21) Appl. No.: 14/997,627

(22) Filed: Jan. 18, 2016

(65) Prior Publication Data

US 2017/0203522 A1 Jul. 20, 2017

(51) Int. Cl.
| | | |
|---|---|---|
| B29C 70/38 | (2006.01) | |
| B29C 70/54 | (2006.01) | |
| B65H 51/04 | (2006.01) | |

(52) U.S. Cl.
CPC .......... *B29C 70/382* (2013.01); *B29C 70/541* (2013.01); *B65H 51/04* (2013.01)

(58) Field of Classification Search
CPC ... B29C 70/382; B29C 70/384; B29C 70/386; B29C 70/388
See application file for complete search history.

(56) References Cited

U.S. PATENT DOCUMENTS 3,574,040 A * 4/1971 Chitwood et al. .... B29C 70/386
156/350
4,208,238 A * 6/1980 August ............. B23K 26/0846
156/510

| | | |
|---|---|---|
| 4,292,108 A | 9/1981 | Weiss et al. |
| 4,351,688 A | 9/1982 | Weiss et al. |
| 4,872,619 A | 10/1989 | Vaniglia |
| 4,877,193 A | 10/1989 | Vaniglia |
| 4,943,338 A | 7/1990 | Wisbey |

(Continued)

FOREIGN PATENT DOCUMENTS

| | | |
|---|---|---|
| EP | 2602091 A2 | 6/2013 |
| WO | 2012050707 | 4/2012 |

OTHER PUBLICATIONS

International Search Report and Written Opinion for International Patent Application No. PCT/US2017/013088 filed on Jan. 12, 2017, dated Mar. 30, 2017.

*Primary Examiner* — Jeffry H Aftergut
(74) *Attorney, Agent, or Firm* — Reising Ethington P.C.

(57) ABSTRACT

A composite placement machine has a simplified fiber delivery path from a creel to a lay-up table. A carriage is mounted for motion in the Y-axis along the length of an overhead beam. A composite placement head having a shiftable compaction roller is supported by the carriage. A stationary creel at one end of the overhead beam forms a band of composite material having a width that extends in the X-axis. A lay-up table is mounted for motion in the X-axis and rotary motion about a C-axis that is perpendicular to the X and Y-axes. The motion of the head in the Y-axis, the shiftable compaction roller, and the motion of the lay-up table X-axis and the C-axis allows the head to apply composite material to the lay-up table in both Y-axis directions in any orientation without twisting the band of composite material relative to the X and Y-axes.

19 Claims, 4 Drawing Sheets

(56) References Cited

U.S. PATENT DOCUMENTS

| | | | |
|---|---|---|---|
| 4,990,213 A | | 2/1991 | Brown et al. |
| 5,239,457 A | | 8/1993 | Steidle et al. |
| 5,645,677 A | * | 7/1997 | Cahuzac ............. B29C 53/8016 156/361 |
| 6,968,883 B2 | | 11/2005 | Torres Martinez |
| 8,613,302 B2 | | 12/2013 | Vaniglia |
| 8,919,410 B2 | | 12/2014 | Kappesser et al. |
| 8,997,818 B2 | | 4/2015 | Vaniglia et al. |
| 2006/0249256 A1 | | 11/2006 | Borgmann et al. |
| 2010/0200168 A1 | | 8/2010 | Oldani et al. |
| 2011/0277935 A1 | | 11/2011 | Borgmann et al. |
| 2013/0233471 A1 | | 9/2013 | Kappesser et al. |

\* cited by examiner

SMALL 4-AXIS FIBER PLACEMENT MACHINE

FIELD

A composite placement machine has a fixed stationary bridge which supports a head to move in the Y-axis, a table which moves in the X-axis and rotates in the C-axis, and a creel which delivers composite material to the head in a straight line path relative to the Y-axis along the stationary bridge.

BACKGROUND

The patent to Kappesser, U.S. Pat. No. 8,919,410 shows a composite placement machine in which the head and creel are at a fixed location and are not moving, and a table moves under the head. This stationary head approach is satisfactory for tables which are generally small at 1 meter or less on a side, for example. As the table size increases, the amount of throat needed under the arm which supports the head becomes excessive to allow for full reach over the full table travel and table rotation, and to clear the support structure. This requires an excessive amount of support structure and floor space.

It would be desirable for a composite placement machine to be able to lay up a relatively large part having dimensions, for example, greater than 1 meter on a side, and to have a simplified material delivery path that does not twist the composite material band as it moves from the creel to the lay-down surface.

SUMMARY

In order to accommodate a table which is, for example, 2 meters on a side, a composite placement machine moves the head along a first linear axis and the table in along a second linear axis perpendicular to the first axis. A table with linear travel capability along one axis allows the table to travel an extended distance to either side of where the material laydown occurs, allowing for secondary operations such as inspection and/or load-unload operations. Such an arrangement is useful, for example, in an installation where a second pallet or table receives material from the head.

The four main features of the machine are a stationary cross bridge, a head which moves primarily along one axis and does not rotate, a table which rotates and also moves along an axis perpendicular to the head, and a fixed creel. The stationary cross bridge supports a slide carrying a composite placement head. A table beneath the bridge moves along an axis that is perpendicular to the bridge, and the table rotates about a vertical axis. The machine design produces a straight line fiber delivery path relative to the Y-axis between the head and creel that is parallel to the primary axis of head motion along the bridge. This results in a fiber path that is completely free of fiber redirections that introduce a lengthwise twist into the composite material band during material deposition and head repositioning. The machine is designed for producing flat parts up to 2 meters square and can be redesigned to have a larger size table.

DESCRIPTION OF THE PREFERRED EMBODIMENT

Figure 1:
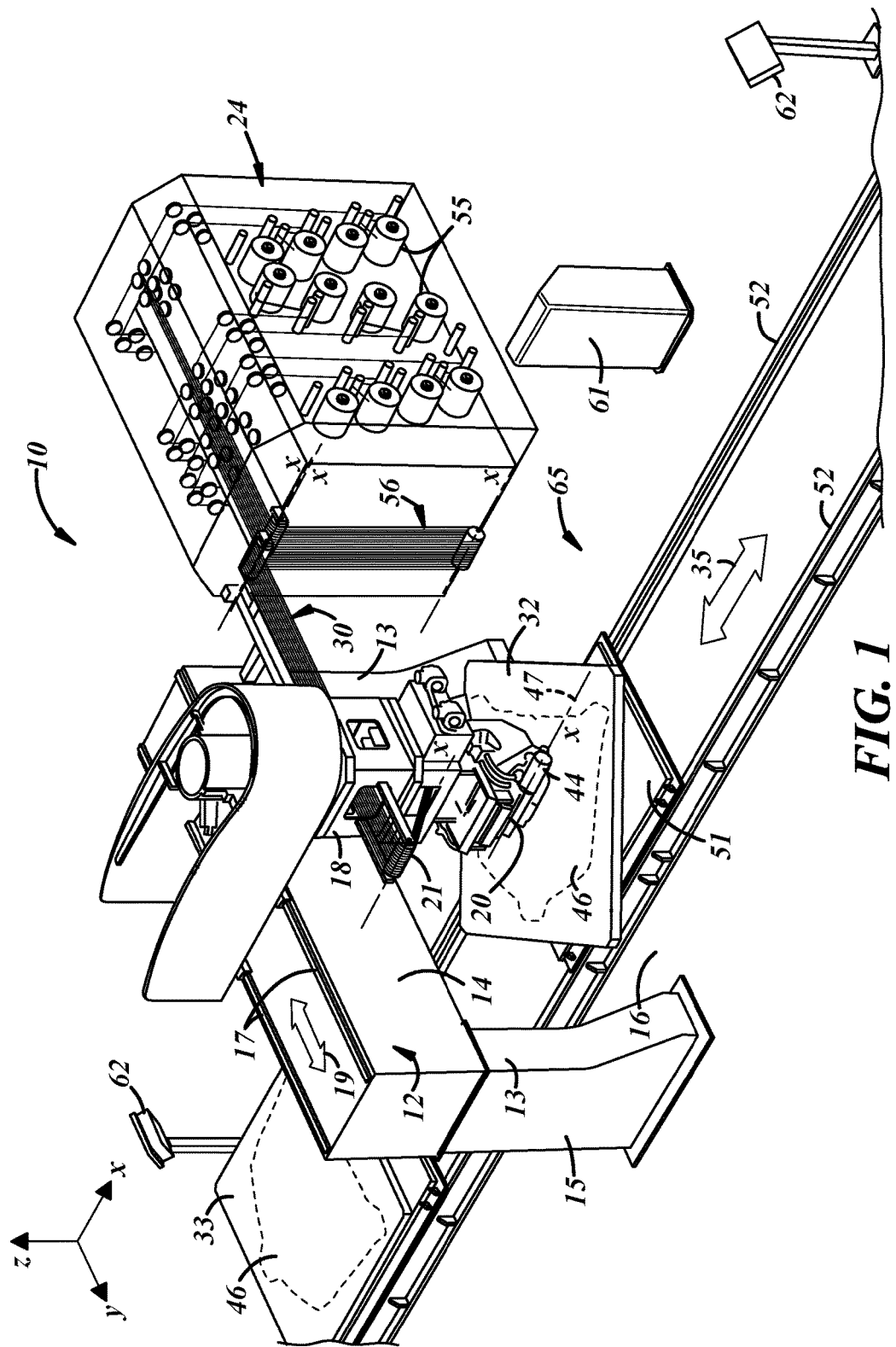
FIG. 1 is a perspective view of a composite placement machine.

Turning now to the drawing figures, FIG. 1 is a perspective view of a composite placement machine generally designated by the reference numeral 10. The composite placement machine 10 comprises a stationary bridge 12 having spaced upright supports 13 and an overhead beam 14 spanning a workzone 16. The overhead beam 14 has two ways 17 that support a carriage 18 that is mounted for horizontal motion along a first linear axis of motion 19 along the length of the beam 14. A composite placement head 20 is supported by the carriage 18, and a carriage redirect roller 21 supported by the carriage 18 has an axis of rotation that is parallel to the X-axis. A first stationary creel 24 may be positioned next to the upright support 13 at one end of the overhead beam 14, and a second stationary creel 26 (best seen in FIG. 2) may be positioned next to the other upright support 13 at the other end of the overhead beam 14. Each creel 24 and 26 forms a band 30 of composite material having a length that extends in the Y-axis and a width 31 (best seen in FIGS. 3 and 4) that extends in the X-axis. As used herein, the term composite material is used to designate resin impregnated fiber, tow, slit tape, prepreg materials, and other similar materials, all of which are well known to those skilled in the art, and all of which terms are used interchangeably in this application.

Figure 4:
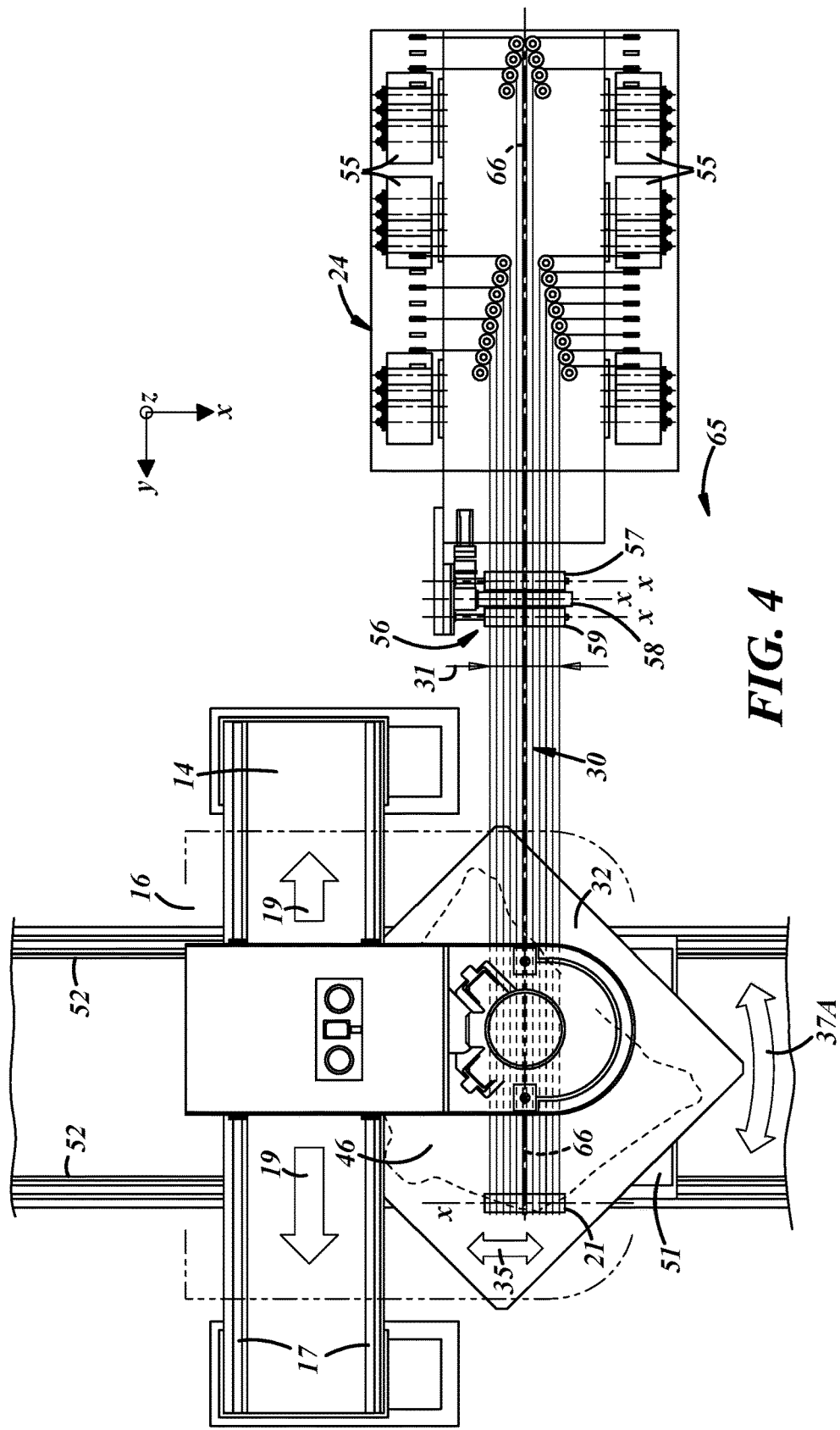
FIG. 4 is an overhead view of the fiber path between the creel and the head.

A two-axis lay-up table 32 is mounted for horizontal motion along a second linear axis of motion 35 that is perpendicular to the first linear axis 19, and rotary motion about a third axis 37 that is perpendicular to the first linear axis of motion 19 and the second linear axis 35. The first linear axis of motion 19 extends along the Y-axis of the machine, the second linear axis of motion 35 extends along the X-axis of the machine, and the rotary motion 37A of the table about a third axis 37 as shown in FIG. 4 is about a vertical C-axis that is parallel to the Z-axis of the machine.

Figure 2:
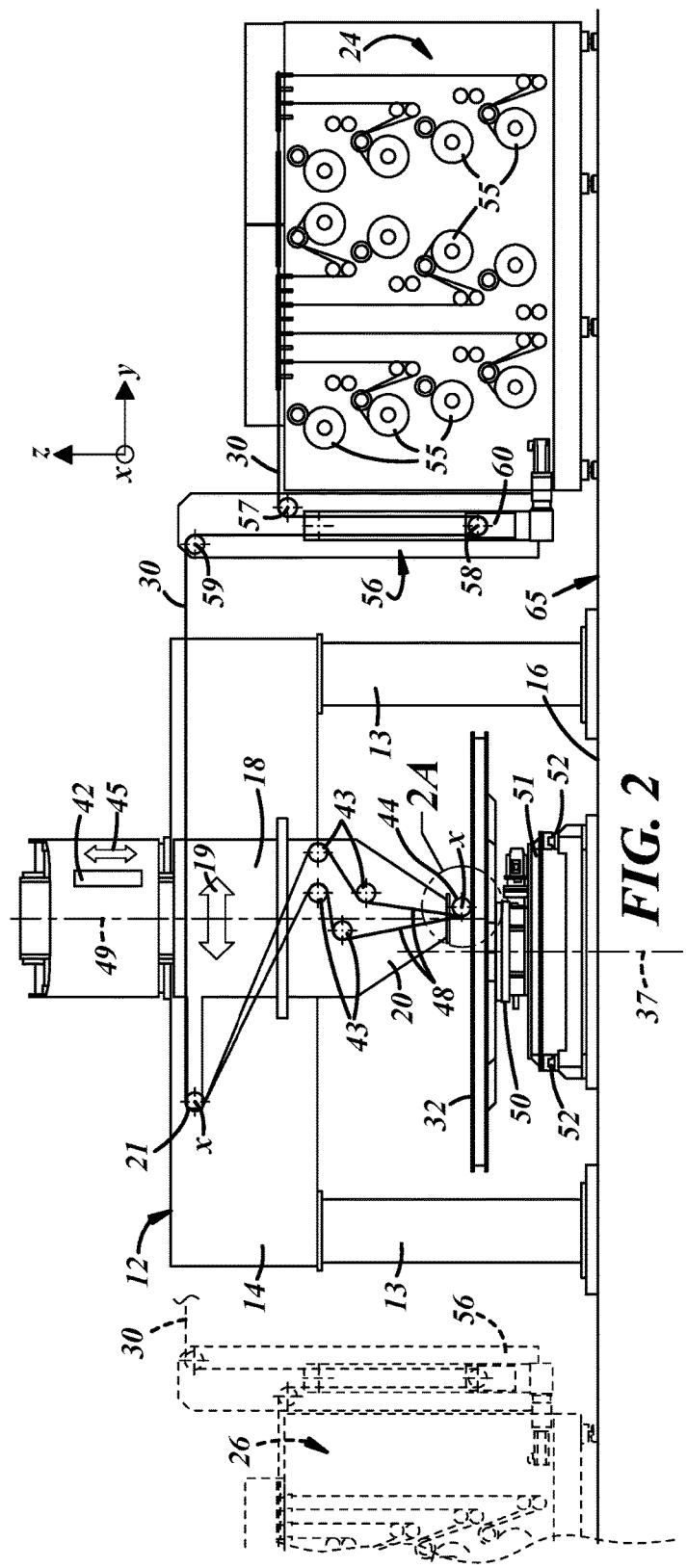
FIG. 2 is a front view of the composite placement machine of FIG. 1.
Figure 2A:
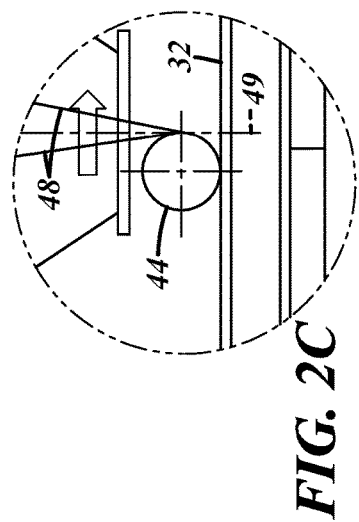
FIG. 2A is a detail view of the circular section 2A of FIG. 2 showing the compaction roller in a raised position.

As shown in FIGS. 1 and 2, a vertically oriented composite placement head 20 depends from the carriage 18. The first linear axis of motion 19 of the head 20 in the Y-axis over the lay-up table 32 is provided by the stationary bridge 12. The composite placement head 20 also has a limited fourth axis of motion, a vertical Z-axis motion 45 provided by a vertical slide 42 in the carriage 18. The limited vertical Z-axis motion 45 of the head 20 is perpendicular to the X and Y-axes and is used during repositioning of the tool 32. The fourth axis of motion 45 is motion in the Z-axis, parallel to the centerline 37 of table rotation 37A, and mutually perpendicular to the first axis of travel, the Y-axis 19, and the second axis of travel, the X-axis 35. The fourth axis of motion 45 is provided to raise and lower the compaction roller 44 a distance D for touch down and retract relative to the tool 32 in order to reposition the tool 32 relative to the head. The same vertical slide 42 is used to raise and lower the head 20 to accommodate the buildup of composite material as layers of composite material 46 are laid up on the tool 32. FIG. 2A shows the compaction roller 44 raised a distance D off of the surface of the lay-up table 32.

The head 20 does not move in the X-axis, and does not rotate or tilt relative to any axis. The head 20 may include a number of head redirect rollers 43 which redirect the composite material 30 from the carriage redirect roller 21 to a compaction roller 44 at the bottom of the head. The number and arrangement of the head redirect rollers 43 in the head 20 may vary depending on the on the particular design of the head. The compaction roller 44 is used to apply composite material to the table or tool 32. The axis of rotation 47 of the compaction roller 44, and of the head redirect rollers 43, are all parallel with the axis of rotation of the carriage redirect roller 21, and are parallel to the X-axis of the machine. The two paths of the composite material 30 between the lowermost head redirect rollers 43 and the compaction roller 44 form a symmetrical "V" shaped delivery path 48 on either side of the vertical centerline 49 of the head 20. The head 20 may include a mechanism to shift the compaction roller 44 to either side of the vertical head centerline 49 to allow the head to apply composite material to the tool 32 while traveling in either direction along the Y-axis 19. One such mechanism for shifting a compaction roller is shown in U.S. Pat. No. 8,613,302 issued to Vaniglia, the disclosure of which is incorporated herein by reference.

Figure 2B:
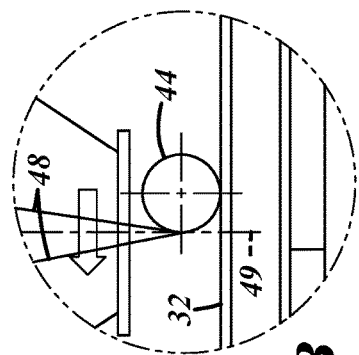
FIG. 2B shows the compaction roller on the right side of the head centerline to apply composite material to the lay-up table while moving to the left.
Figure 2C:
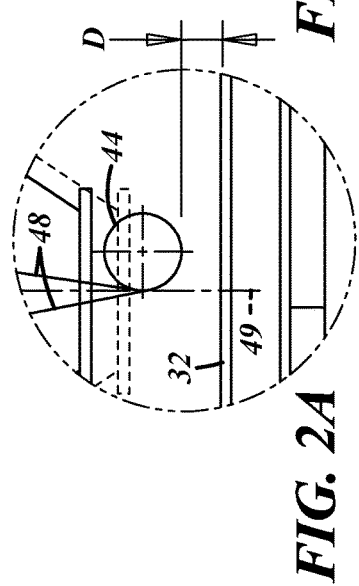
FIG. 2C shows the compaction roller on the left side of the head centerline to apply composite material to the lay-up table while moving to the right.

FIG. 2B shows the compaction roller on the right side of the vertical centerline 49 in order to apply composite material to the lay-up table 32 while moving to the left. FIG. 2C shows the compaction roller on the left side of the vertical centerline 49 in order to apply composite material to the lay-up table 32 while moving to the right. It is also possible to apply composite material to the lay-up table 32 while moving in one direction only, in which case the mechanism for shifting the compaction roller 44 may be eliminated from the machine.

Figure 3:
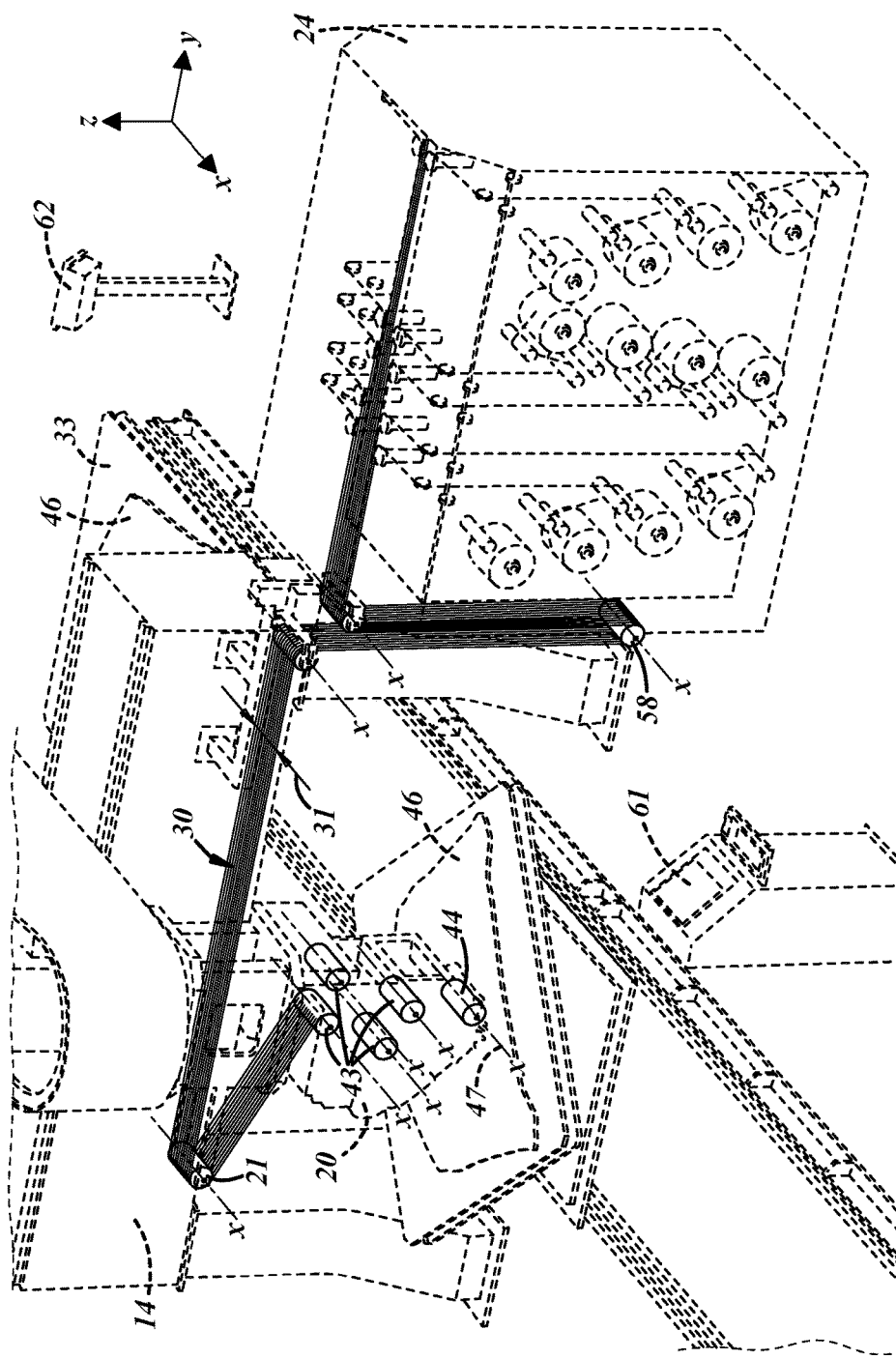
FIG. 3 is a perspective view of the fiber path of the composite placement machine of FIGS. 1 and 2.

The table 32 is mounted on a turntable 50 to rotate in the vertical C-axis 37, perpendicular to the X and Y-axes, and the turntable 50 is mounted on a cart 51 that rides on rails or guide ways 52 extending in the X-axis direction 35, perpendicular to the Y-axis direction 19. As shown in FIGS. 1 and 3, two tables 32 and 33 may be provided; one table may be positioned under the head 20 for fiber lay-up while the other table may be positioned at one end of the rails 52 for part removal. Each lay-up table 32 and 33 comprises a 2-axis table that offers a secondary linear table motion 35 in the X-axis that is perpendicular to the primary Y-axis motion 19, and a third rotary motion in the C-axis with a rotation centerline 37 that is perpendicular to both the primary 19 and secondary 35 directions of motion. Each of the tables 32 and 33 has sufficient linear travel on the ways 52 in the X-axis to index a lay-up charge 46 on the table 32 to a convenient point remote from the stationary bridge 12 and from the other table for part removal.

As shown in FIG. 4, the creel 24 may have spools 55 of composite material on two sides, and includes a festoon 56. The festoon 56 provides tension to the band of composite material 30 delivered to the head 20, and takes up composite material 30 when the head 20 moves toward to the creel 24. The creel 24 is mounted on the floor 65 and has a centerline 66 that passes through the center of the festoon 56, the carriage redirect roller 21, the head redirect roller 43, the compaction roller 44, and the head 20 along the direction 19 of the Y-axis. The creel delivers composite material 30 to the head in the Y-axis direction 19 as the head moves to and from the creel 24 along a straight line that is parallel to the Y-axis direction. FIG. 4 shows that the machine design produces a fiber delivery path between the carriage redirect roller 21 and the creel 24 that is a straight line relative to the Y-axis, and that is parallel to the primary axis of head motion 19 along the beam 14.

As shown in FIGS. 2 and 4, the festoon 56 at the payout of the creel 24 maintains the proper tension on the composite material 30 as the head extends and retracts along the primary linear axis of motion 19 relative to the creel 24. The festoon 56 comprises a first festoon redirect roller 57 at the output of the creel 24, a second festoon redirect roller 58 at the lower end of the festoon 56, and a third festoon redirect roller 59 at the output of the festoon. The second festoon redirect roller 58 is mounted on a festoon slide 60 that moves up and down parallel to the Z-axis depending position of the head 20 along the Y-axis of motion 19 to maintain slack-free tension on the composite material passing through the festoon 56. The axes of rotation of the festoon rollers 57, 58, and 59 are all parallel to the axis of rotation of the carriage redirect roller 21, the head redirect rollers 43, the compaction roller 44, and the X-axis of the machine. The number and arrangement of the rollers in the festoon may vary depending on the particular design of the festoon.

An operator control station 61 may positioned near the front of the creel 24 outside of the workzone 16 to provide visual access to the creel 24 and the table 32. The operator control station 61 may be supported from overhead for easy viewing of the creel 24 and the table 32, or may be mounted on the floor 65. Secondary control stations 62 may be mounted at either end of the rails 52 for control of the motion of the cart 51 and the tables 32 and 33 when the cart is at the end of the rails for part loading and unloading operations.

In operation, limiting the motion of the head 20 to the Y-axis direction 19, and limiting the motion of the lay-up table 32 to the X-axis direction 35, and about the vertical C-axis 37, allows the head to apply composite material to the lay-up table 32 in any orientation without twisting the width 31 of the band of composite material 30 about the Y and Z-axes during the lay-up process. The fiber path between the creel 24 and the head 20 remains straight relative to the Y-axis during operation since the head 20 only moves in the Y-axis direction 19, parallel to the beam 14. The axis of the festoon rollers 57, 58, and 59, the carriage redirect roller 21, the head redirect rollers 43, and the compaction roller 44 all remain parallel to the X-axis during material layup operations. As shown in FIGS. 2B and 2C, the shiftable compaction roller 44 allows dual direction lay-up of composite material. The second creel 26 may be used to alternate the feed of composite material to the head 20 resulting in continuous laying of composite material onto the tool 32.

The advantage of the small 4-axis composite placement system over other fixed head small flat placement systems is that moving the head 20 along the bridge 12 enables much wider part sizes without the head being cantilevered out over a large shuttling table, and without the requirement of a deep throated head support arm that would be required for a wider shuttling table. The symmetrical V-shaped path 48 of the composite material 30 and the ability to shift the compaction roller 44 to either side of the head centerline 49 allows rapid Y-axis motion reversal of the head with bi-directional application of composite material to the tool 32.

The composite placement machine has a simplified path for delivery of the fiber band 30 from the 24 creel to the 2-axis lay-up table 32. The cross-travel lamination direction of motion 19 of the head 20 is always along the length of the beam 14, and parallel to the Y-axis and to the fiber feed path from the creel 24. This establishes a simple in-line fiber delivery path at all times without requiring band twist of the fiber band 30 between the creel 24 and the compaction roller 44. Since the head 20 does not rotate relative to any axis, all tow motion across the carriage redirect roller 21 is always in the plane of rotation of the redirect roller 21. As a result, no side loads are imparted to the composite material during redirect. This provides less fuzz build-up from the compaction material 30 at high deposition rates. The festoon 56 is used to control fiber tension as the head 20 cross-travels on the bridge 12 over the table 32. The festoon 56 allows the head 20 to rapidly move toward and away from the creel 24 in any processing situation.

The small 4-axis composite placement machine configuration enables the flat charge manufacture of parts larger than 1 meter on a side, and up to 3 meters on a side. Of course, the part that is manufactured need not be square; it may be rectangular, prismatic, round, irregularly shaped, or any combination of these shapes. The smallest practical size for a part is 0.25 meters on a side. The 4-axes of machine motion provide the ability to produce a flat charge 46 with any ply orientation relative to the X and Y-axes. The moving lay-up table 32 has a lower moving machine mass than a head having multi-axis motion capability, and improved operator access. The rotation of the table 32 around the C-axis 37 enables bi-directional lay-up of composite material that can deliver a balanced lamination. This results in thicker ply charges produced accurately at higher lay-up speeds and acceleration at a lower cost.

Having thus described the device, various modifications and alterations will occur to those skilled in the art, which modifications and alterations are intended to be within the scope of the device as defined by the appended claims.

We claim:

1. A composite placement machine having a simplified fiber delivery path from a creel to a lay-up table, the machine comprising:
    a stationary bridge comprising spaced upright supports and an overhead beam having a length and extending in a horizontal Y-axis spanning a workzone;
    a carriage mounted for horizontal Y-axis motion along the length of the overhead beam;
    a composite placement head supported by the carriage for motion only in a horizontal Y-axis and limited vertical motion in a Z-axis;
    a carriage redirect roller supported by the carriage and mounted for rotation about an X-axis;
    a plurality of head redirect rollers which redirect composite material from the carriage redirect roller to a shiftable compaction roller;
    a V-shaped path for the composite material between the carriage redirect rollers and the shiftable compaction roller, said V-shaped path being symmetrical about a vertical centerline of the head;
    a stationary creel positioned next to one of the upright supports, the stationary creel forming a band of composite material having a width that extends in the X-axis and a length that extends in the Y-axis;
    a festoon positioned between the creel and the carriage;
    a lay-up table in the workzone mounted for motion in a horizontal X-axis and rotary C-axis motion about a vertical axis perpendicular to the Y-axis and the X-axis, whereby the motion of the head in the Y-axis, and the motion of the lay-up table in the X-axis and about the vertical C-axis allows the head to apply composite material to the lay-up table in any orientation without twisting the width of the band of composite material relative to the X and Y-axes, and whereby the shiftable compaction roller is able to shift to either side of the vertical centerline of the head to apply composite material to the lay-up table in either direction along the Y-axis.

2. The composite placement machine of claim 1 wherein the limited motion of the composite placement head in the vertical Z-axis is used to touch down and retract the head from the lay-up table.

3. The composite placement machine of claim 1 wherein motion of the composite placement head in the vertical Z-axis is used to accommodate the buildup of composite material on the lay-up table as a composite material part is formed.

4. A composite placement machine having a simplified fiber delivery path from a creel to a lay-up table, the machine comprising:
    a stationary bridge comprising spaced upright supports and an overhead beam having a length extending along a Y-axis and spanning a workzone;
    a carriage mounted for horizontal motion along a primary linear axis of motion along the length of the overhead beam;
    a composite placement head supported by the carriage;
    a carriage redirect roller in the carriage mounted for rotation about an X-axis;
    a first stationary creel positioned next to one of the upright supports at one end of the overhead beam, the first stationary creel forming a band of composite material having a width that extends in the X-axis;
    a festoon positioned apart from the creel in between the first stationary creel and the carriage, whereby the festoon maintains slack-free tension on the composite material as the head extends and retracts along the Y-axis relative to the creel; and,
    a lay-up table mounted for horizontal motion along a secondary linear axis perpendicular to the primary linear axis and mounted for tertiary rotary motion about a centerline that is perpendicular to the primary linear axis and the secondary linear axis, whereby the motion of the head in the primary axis of linear motion, and the motion of the lay-up table in the secondary linear axis and in the tertiary rotary motion allows the head to apply composite material to the lay-up table in any orientation without the width of the band of composite material between the creel and the head twisting relative to the X and Y-axes.

5. The composite placement machine of claim 4 wherein the primary linear axis of motion extends along the Y-axis of the machine.

6. The composite placement machine of claim 5 wherein the secondary linear axis of motion extends along the X-axis of the machine.

7. The composite placement machine of claim 6 wherein the tertiary rotary axis of motion is a vertical C-axis that is perpendicular to the primary and secondary linear axis of motion.

8. The composite placement machine of claim 6 wherein the composite placement head is capable of limited Z-axis motion that is perpendicular to the X and Y axes.

9. The composite placement machine of claim 4 further comprising:
    a first festoon redirect roller at the output of the creel; a second festoon redirect roller at the lower end of the festoon; and, a third festoon redirect roller at the output of the festoon, whereby the axis of rotation of the first, second, and third festoon redirect rollers are all parallel to the X-axis.

10. The composite placement machine of claim 9 further comprising:
a vertical slide in the composite placement head, wherein the vertical slide raises and lowers the composite placement head relative to the lay-up table.

11. The composite placement machine of claim 4 further comprising:
a fourth axis of motion for the composite placement head, the fourth axis of motion comprising vertical motion in the Z-axis that is used to touch down and retract the head from the lay-up table.

12. The composite placement machine of claim 11 wherein the fourth axis of motion is used to accommodate the buildup of composite material on the lay-up table as a composite material part is formed.

13. The composite placement machine of claim 4 wherein the primary linear axis of motion of the head is provided solely by the motion of the carriage across the overhead beam.

14. The composite placement machine of claim 4 further comprising:
a second stationary creel positioned next to another of the upright supports at a second end of the overhead beam.

15. The composite placement machine of claim 4 further comprising:
a straight line fiber delivery path between the creel and the composite placement head in which the composite material feed path is parallel to the primary axis of head motion along the overhead beam, and wherein the fiber path does not have any composite material redirections that induce a lengthwise twist into the composite material during material layup and head repositioning.

16. The composite placement machine of claim 4 wherein all composite material motion across the carriage redirect roller is always in the plane of rotation of the carriage redirect roller, whereby no side loads are imparted to the composite material as it passes over the carriage redirect roller.

17. The composite placement machine of claim 4 wherein the rotation of the lay-up table is sufficient for bidirectional lay-up of composite material without the requirement to rotate the composite placement head relative to overhead beam.

18. The composite placement machine of claim 4 further comprising:
a shiftable compaction roller supported by the carriage for motion in the Y-axis, whereby the shiftable compaction roller is able to shift to either side of a vertical centerline of the head to apply composite material to the lay-up table in either direction along the Y-axis.

19. The composite placement machine of claim 18 further comprising:
linear guide ways extending in the X-axis in the workzone, the linear guide ways supporting the lay-up table for motion in the X-axis; and,
a second lay-up table in the workzone, wherein the second lay-up table is supported on the linear guide ways and is positionable at a distance from the first lay-up table to allow a composite part to be removed from the second lay-up table while the first lay-up table is positioned beneath the composite placement head.

* * * * *